Oct. 18, 1955  C. M. STROUP ET AL  2,720,861
BEDDING DEVICE FOR BOVINE OR LIKE ANIMAL STALLS
Filed Sept. 28, 1953  2 Sheets-Sheet 1
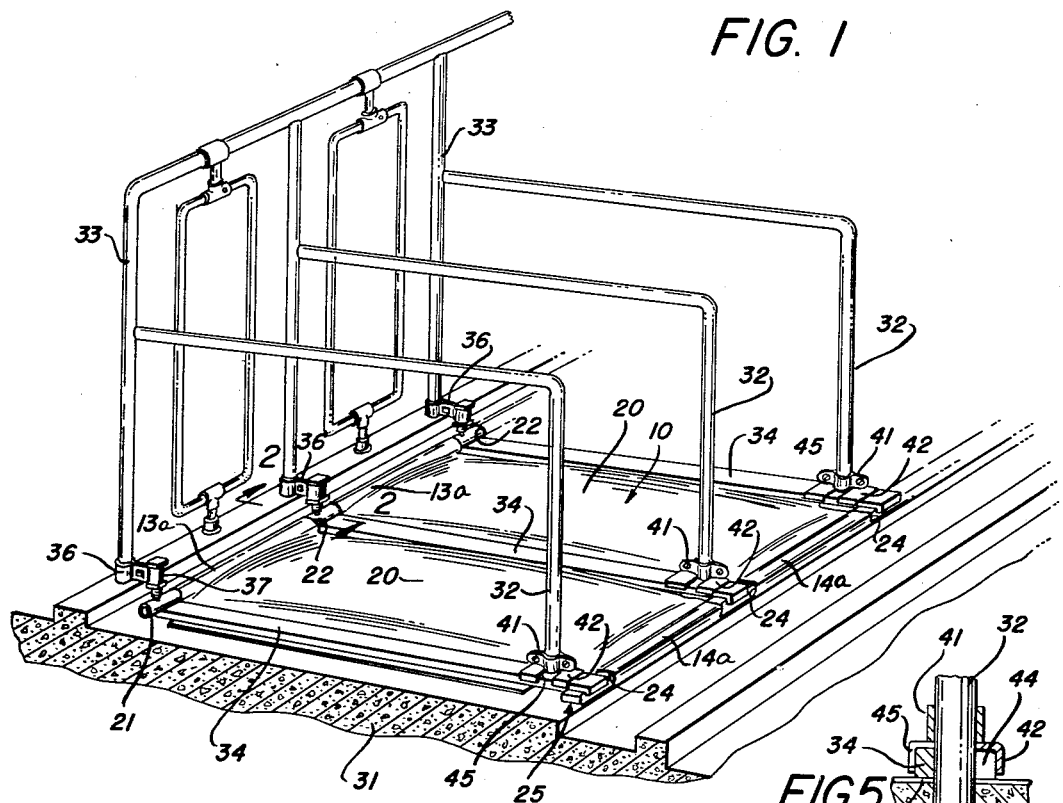
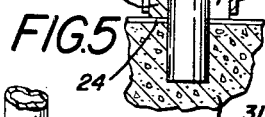
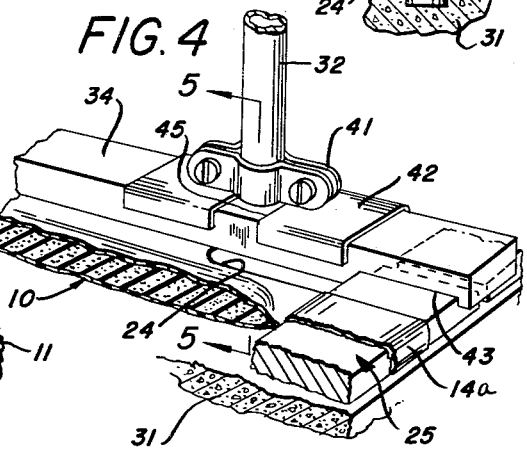
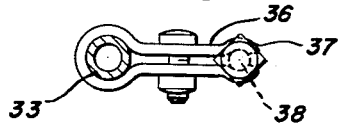
INVENTORS
CYNTHIA M. STROUP &
BY   DANIEL L. STROUP
William Cleland
ATTORNEY Oct. 18, 1955  C. M. STROUP ET AL  2,720,861
BEDDING DEVICE FOR BOVINE OR LIKE ANIMAL STALLS
Filed Sept. 28, 1953  2 Sheets-Sheet 2
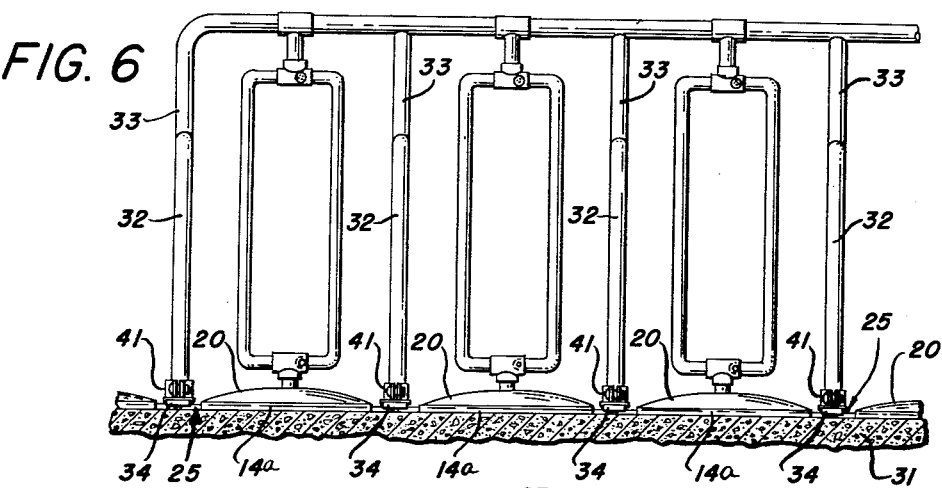
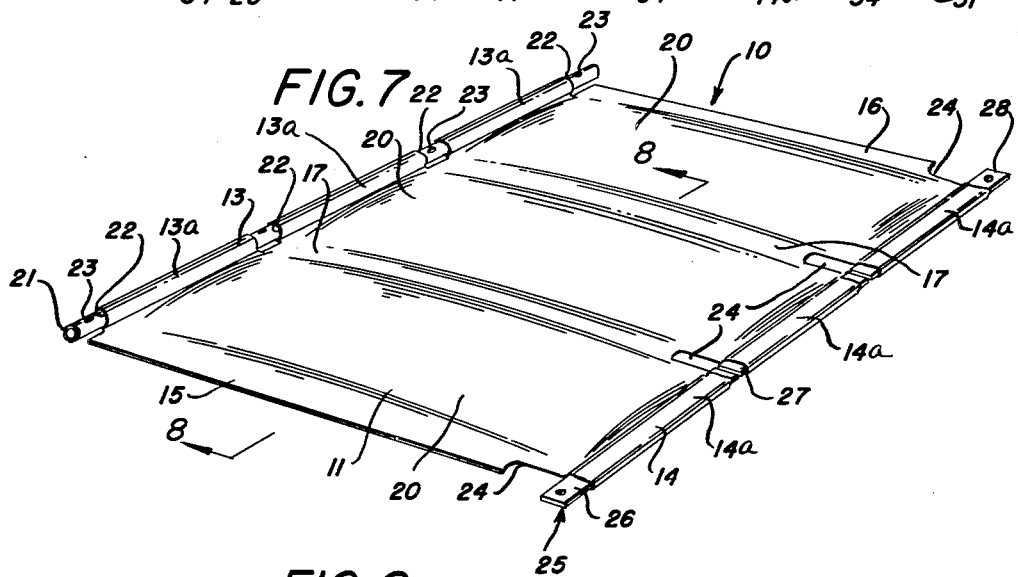
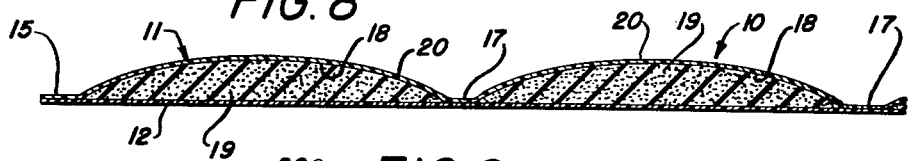
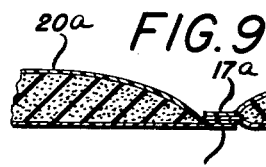
INVENTORS
CYNTHIA M. STROUP &
BY   DANIEL L. STROUP
William Cleland
ATTORNEY United States Patent Office 2,720,861
Patented Oct. 18, 1955

2,720,861

BEDDING DEVICE FOR BOVINE OR LIKE ANIMAL STALLS

Cynthia M. Stroup and Daniel L. Stroup, Barberton, Ohio

Application September 28, 1953, Serial No. 382,758

7 Claims. (Cl. 119—28)

This invention relates to bedding for the stalls of farm animals, such as cows.

Heretofore, a serious problem has been presented on farms in connection with maintaining cow stalls in clean sanitary condition. This problem has been aggravated by the continuously increasing costs of the usual loose straw bedding and the labor required for removing soiled straw and replacing the same with fresh clean straw. Straw bedding, moreover, if not frequently replaced is apt to become so unsanitary as to cause cows to have diseased udders.

One object of the invention is to provide a permanent waterproof bedding which eliminates the use of loose straw entirely for the purposes described, and which is easily kept clean and sanitary to prevent cows from contracting diseases affecting the udders.

Another object of the invention is to provide a soft, resilient bedding device of the character described which is substantially indestructible, the same including improved padding and means for readily removably anchoring the same to the floor of animal stalls.

These and other objects of the invention will be manifest from the following brief description and the accompanying drawings.

Of the accompanying drawings:

Figure 1 is a perspective view showing three cow stalls having the improved bedding device installed therein.

Figure 2 is an enlarged fragmentary vertical cross-section, taken substantially on the line 2—2 of Figure 1, showing rearward clamping means for the bedding device.

Figure 3 is a horizontal cross-section, taken substantially on the line 3—3 of Figure 2, on the same scale.

Figure 4 is an enlarged fragmentary perspective view, partly broken away and in section, showing forward clamping means for the bedding device.

Figure 5 is a vertical cross-section taken substantially on line 5—5 of Figure 4.

Figure 6 is a front elevation of a portion of the cow stalls shown in Figure 1.

Figure 7 is a perspective view of the improved padding of the bedding device removed from the stalls.

Figure 8 is an enlarged cross-section taken substantially on the line 8—8 of Figure 7.

Figure 9 is a cross-section similar to a portion of Figure 8, illustrating a modified form of the padding.

Referring to Figures 1 to 8, and in particular to Figures 7 and 8, the improved bedding includes a pad unit 10 formed of superposed layers 11 and 12 of rubberized fabric or cord sheeting joined, as by sewing or other means, along opposite front and back marginal portions 13 and 14, laterally opposite marginal portions 15 and 16, and intermediate portions 17, 17 parallel to said portions 15 and 16, to define hollow chambers 18 which contain fillings 19, 19 of cellular elastic material, such as foam latex, and thereby providing a series of laterally spaced, relatively soft, resilient pads 20, 20. The fillings 19 may each be composed of a single relatively thick layer of foam latex, or a multiplicity of relatively small pieces thereof.

The back marginal edge portion 13 of the padding 10 is provided with discontinuous hemmed portions 13a, 13a to receive an elongated tubular rod 21, opposite ends of which extend freely as shown, there being cut-out portions 22 opposite each thin intermediate portion 17, to expose apertures 23 in the rod 21. Similarly, the front marginal edge portion is provided with discontinuous hemmed portions 14a, defined by cut-out portions 24 extended inwardly along the thin portions 15, 16 and 17, 17, and having a flat bar 25 received therethrough. Bar 25 may be in segments 26, 27 and 28 to have adjoining ends aligned with the central portions of the slots 24, for purposes to be described.

As best shown in Figures 1 and 6, the pad unit 10 is mounted on concrete flooring 31 of the usual cow barn to have the respective resilient pads 20, 20, occupying substantially the entire floor areas of stalls defined between laterally aligned upright pipes anchored in said flooring, said pipes including series of front and rear stanchions 32, 32 and 33, 33, respectively, and the front stanchions 32 being received within the cut-out portions 24 in the padding. Flat anchoring bars 34, 34 engaging downwardly on the thin marginal portions 15, 16 and 17, 17, have rear end portions engaged under the tubular rod 21 and front ends engaged on top of exposed portions of the front bar 25. In the case of the intermediate bars 34, the front ends thereof overlie adjacent ends of the bar sections 26, 27 and 28.

Referring particularly to Figures 2 and 3, for fixedly holding the rear portion of padding 10 against flooring 31, releasably clamped to each rear stanchion 33 may be a bracket 36 in a forwardly extended split end portion 37 of which is vertically adjustably received a pin 38 having its lower end in abutment with the top of said rod 21. A reduced end 39 on each pin 38 may engage in a corresponding aperture 23 in the top of the rod to prevent forward or rearward displacement of the rod 21. For similarly holding the forward portions of padding 10 against the flooring, as best shown in Figures 4 and 5, a split collar 41 releasably clamped to each forward stanchion 32 holds a channel-shaped clip 42 against the top of a bar 34, the latter engaging firmly against the thin transverse marginal portions 15, 16 or 17, 17 of the padding 10, and the forward ends thereof engaging downwardly on corresponding portions of the sections 26, 27 and 28 of front clamping bar 25. A recess 43 on the underside of each bar 34 prevents forward or rearward displacement of the latter.

Each bar 34 is slotted inwardly from one side edge, as indicated at 44 (see Figure 5), and clip 42 has a slot 45 extending from the opposite side, whereby upon upward adjustment of split collar 41 on stanchion 32 and clip 42 said bar 34 is easily removed, providing the clamping action on rear clamping rod 21 has been released by upward adjustment of the clamping clips 36 on rear stanchions 33.

Upon removal of the bars 34, as described above, the entire padding unit 10 is easily removed by spreading the adjacent sections 26, 27 and 28 of bar 25 apart while manipulating the adjacent ends thereof upwardly and inwardly past corresponding stanchions 32, whereby the padding unit may be bunched, folded or rolled to elongated shape which will permit removal of the same endwise from the stalls, as for a cleaning operation thereon by use of steam, hot water or other means. Conversely, after such a cleaning operation, the padding unit may be repositioned on the flooring 31 and firmly clamped thereto as previously described.

In use of the improved bedding firmly anchored in position as shown in Figures 1 to 6, cows in the respective stalls may stand or rest upon the soft resilient pads 20 therein in substantial comfort. Because the pads are easy to keep clean, usually by use of steam or water while in said anchored condition, the tendency of the cows to contract diseases of the udder is reduced to a minimum. Less frequently the padding 10 may be removed as described above for more thoroughly cleaning the same and the underlying portions of the stalls.

Figure 9 shows a suggested modification of the padding 10, wherein the same includes a plurality of separable resilient pad units 20a, one for each cow stall, the adjacent marginal edge portions 17a, 17a of the pads 20 being overlapped and adapted to be held against flooring 31 substantially in the manner previously described. The padidng is otherwise substantially the same as before.

The word "stanchion" as used in the claims herein is to be construed in the broad dictionary sense as an upright, bar, post, prop, brace, or other anchored means on which clamping means may be mounted or attached for holding the rigid members of the padding against the floor.

Modifications of the invention may be resorted to without departing from the spirit thereof or the scope of the appended claims.

What is claimed is:

1. Bedding for bovine or like animal stalls having a floor and front and rear stanchions anchored therein, comprising at least one panel of resilient padding adapted to cover approximately the floor area of an animal stall, said panel having relatively rigid members attached along opposite side edges thereof, and clamping means on said stanchions and having portions engaging said rigid members for clamping said members to the floor.

2. Bedding for bovine or like animal stalls having a floor and front and rear stanchions anchored therein, comprising at least one panel of resilient padding adapted to cover approximately the floor area of an animal stall, said panel having relatively rigid members attached along opposite side edges thereof, and clamping means on said stanchions and having portions engaging said rigid members for clamping said members to the floor, said padding comprising a casing of moisture-proof, flexible, sheet material, containing a filler of relatively soft, resilient material.

3. Bedding for bovine or like animal stalls having a floor and front and rear stanchions anchored therein, comprising at least one panel of resilient padding adapted to cover approximately the floor area of an animal stall, said panel having relatively rigid members attached along opposite side edges thereof, and clamping means on said stanchions and having portions engaging said rigid members for clamping said members to the floor, said padding comprising a casing of moisture-proof, flexible, sheet material, containing a filler of relatively soft, resilient material, said filler being cellular rubber.

4. Bedding for bovine or like animal stalls having a floor and front and rear stanchions anchored therein, comprising a plurality of panels of resilient padding each adapted to cover a major portion of the floor area of an animal stall, marginal portions of said panels being anchored to a rectangular framework of rigid material, and clamping means on said stanchions and having portions adjustably engaging said framework for clamping the same and said panels flatly against said stall floor areas.

5. Bedding as set forth in claim 1, wherein said padding comprises a casing means having top and bottom layers of moisture-proof, flexible sheet material joined at said marginal portions thereof to define chambers in the panels, said chambers being filled with relatively soft, resilient material.

6. Bedding for bovine or like animal stalls having a floor and front and rear stanchions anchored therein, comprising a plurality of panels of resilient padding each adapted to cover a major portion of the floor area of an animal stall, marginal portions of said panels being anchored to a rectangular framework of rigid material, and clamping means on said stanchions and having portions adjustably engaging said framework for clamping the same and said panels flatly against said stall floor areas, wherein said padding comprises a casing means having top and bottom layers of moisture-proof, flexible sheet material joined at said marginal portions thereof to define chambers in the panels, said chambers being filled with relatively soft, resilient material.

7. Bedding as set forth in claim 6, wherein said padding comprises a casing means having top and bottom layers of moisture-proof, flexible sheet material joined at said marginal portions thereof to define chambers in the panels, said chambers being filled with relatively soft, resilient material, said framework including angularly disposed rigid bars releasably interengaging at intersecting points.

References Cited in the file of this patent

UNITED STATES PATENTS

| | | |
|---|---|---|
| 307,512 | Willis | Nov. 4, 1884 |
| 337,070 | McDonough | Mar. 2, 1886 |
| 739,682 | Kahl | Sept. 22, 1903 |
| 2,110,909 | Henderson | Mar. 15, 1938 |
| 2,241,466 | Lovick | May 13, 1941 |
| 2,327,624 | Denman | Aug. 24, 1943 |
| 2,337,009 | Wandel | Dec. 14, 1943 |
| 2,665,664 | Benjamin | Jan. 12, 1954 |

FOREIGN PATENTS

| | | |
|---|---|---|
| 15,512 | Great Britain | 1900 |